United States Patent
Tsao

(10) Patent No.: US 7,683,901 B2
(45) Date of Patent: Mar. 23, 2010

(54) SYSTEM AND METHOD FOR ADAPTIVE TILE DEPTH FILTER

(75) Inventor: You-Ming Tsao, Taipei (TW)

(73) Assignee: ITE Tech. Inc., Hsinchu (TW)

( * ) Notice: Subject to any disclaimer, the term of this patent is extended or adjusted under 35 U.S.C. 154(b) by 745 days.

(21) Appl. No.: 11/512,398

(22) Filed: Aug. 30, 2006

(65) Prior Publication Data

US 2007/0273689 A1    Nov. 29, 2007

(30) Foreign Application Priority Data

May 23, 2006    (TW)    ............... 95118218 A

(51) Int. Cl.
*G06T 15/40* (2006.01)
(52) U.S. Cl. .................................................. 345/422
(58) Field of Classification Search .................. None
See application file for complete search history.

(56) References Cited

U.S. PATENT DOCUMENTS 6,313,839 B1 * 11/2001 Larson ..................... 345/422
6,611,264 B1 * 8/2003 Regan ..................... 345/422
6,999,076 B2   2/2006 Morein .................... 345/422
7,505,036 B1 * 3/2009 Baldwin ................... 345/421

OTHER PUBLICATIONS

U.S. Appl. No. 10/790,953, filed Mar. 2, 2004, Seiler et al.
Akenine-Moller et al: Graphics for the Masses: A Hardware Rasterization Architecture for Mobile Phone (SIGGRAPH 2003).
Yu et al.: A Hierarchical Depth Buffer for Minimizing Memory Bandwidth in 3D Rendering Engine: Depth Filter (ISCAS 2003).

\* cited by examiner

*Primary Examiner*—Ulka Chauhan
*Assistant Examiner*—Said Broome
(74) *Attorney, Agent, or Firm*—Jianq Chyun IP Office

(57) ABSTRACT

An efficient system and method for adaptive tile depth filter (ATDF) is disclosed. The key concept of this system and method is to consider more occlusion conditions in order to achieve a better performance of filter before the conventional Z test process in three dimensional graphics pipeline. Two occlusion criteria, Zmax and Zmin (depth range in a tile), are introduced first for occlusion and non-occlusion fragments in a tile. The points between Zmax and Zmin are in uncertain fragment which may need to go through the later Z test. Moreover, a new technique, coverage mask, can further filter the points in the uncertain fragment to a final uncertain fragment and non-occlusion fragment. Besides, the coverage mask can be used to efficiently decide which tile needs the further sub-tile depth filter.

18 Claims, 8 Drawing Sheets

FIG. 7

SYSTEM AND METHOD FOR ADAPTIVE TILE DEPTH FILTER

BACKGROUND OF THE INVENTION

1. Field of the Invention

The present invention relates to a filter technique in render pipeline of three dimensional graphics processor, more particularly to a system and method wherein render pipeline is used to maintain scene depth relationship in three dimensional graphics, and can be applied on digital still cameras (DSC), digital video cameras (DV), personal digital assistants (PDA), mobile electronics, third generation cellular phones, portable cellular phones, and portable devices (e.g. smart phone).

2. Description of the Prior Art

In recent years, the market of mobile electronics has grown rapidly. Meanwhile, three dimensional graphics has became more and more important in mobile or portable devices, whose energy efficiency of the mobile graphics processors is the most crucial design challenge. It is shown that the amount of external memory access is the most crucial factor in power consumption. In the render pipeline of graphics processor, there are five types of memory access, Texture Read (TR), Depth buffer (Z-buffer) Read (ZR), Depth buffer (Z-buffer) Write (ZW), Color Read (CR), and Color Write (CW). Among these five memory bandwidth demands, the ZR bandwidth occupies at least 40%. It means the depth buffer bandwidth is the first critical part that should be optimized in a low power rendering pipeline.

U.S. Pat. No. 6,999,076 and U.S. patent application Ser. No. 10/790,953 show a Zmax algorithm to cull occluded fragments in render pipeline. The display region is segmented into several tiles. In each tile, the maximum depth value (Z-value), Zmax, is compared with the previous Zmax to cull occluded fragments. When the present Zmax is larger than the previous Zmax, all the fragments of the current tile will be culled. Morein's Zmax algorithm can remove redundant memory bandwidth and operation power of the occluded fragments. Möller proposed another algorithm in different point of view, Zmin algorithm, see e.g., "Graphics for the Masse: A Hardware Rasterization Architecture for Mobile Phones (SIGGRAPH 2003)". The display region is segmented into several tiles. In each tile, the minimum Z-value, Zmin, is compared with previous Zmin to filter non-occluded fragments. When the present Zmin is smaller than the previous Zmin, all the fragments in the current tile can be treated as viewable fragments. Möller's Zmin algorithm can reduce the ZR bandwidth of the viewable fragments. Yu and Kim proposed a pixel-based depth-plane filter (DF) algorithm, see e.g. "A Hierarchical Depth Buffer for Minimizing Memory Bandwidth in 3D Rendering Engine: DEPTH FILTER (ISCAS 2003)". A set of DF-flag is given in display coordinate (pixel-base). When a fragment's Z-value is smaller than the system depth plane (a given value), its corresponded DF-flag is set as "1". However, when a fragment's Z-value is larger than the system depth plane, its corresponded DF-flag is fetched. If the fetched DF-flag is "1", it means the current fragment is occluded by previous fragment and the current fragment should be culled.

Obviously, Morein's Zmax algorithm only filters the occluded fragments in tile base, and Möller's Zmin algorithm only filters the non-occluded fragments in tile base. Although Yu's and Kim's DF algorithm filter the occluded fragments in pixel-base, the filter performance really depends on the system-given depth plane. It is hard to gather the statistics of the depth information of all fragments to derive the optimal depth plane.

SUMMARY OF THE INVENTION

In order to lower down the memory bandwidth (i.e. power consumption), the present invention classifies the fragments into four categories, occluded pixel, non-occluded pixel, uncertain pixel, and uncovered pixel at beginning stage of the render pipeline. First, there is not one criterion but two criteria, maximum Z-value (Zmax) and minimum Z-value (Zmin), used to divide all fragments into three categories in each tile. These three categories are occluded pixel, non-occluded pixel, and uncertain pixel individually. Further, a new technique, coverage mask, is introduced. It is a pixel-based mask to represent whether the pixel is drawn or not. By the coverage mask, the first-drawn (uncovered) pixels can be filtered out from the former uncertain pixels. Note that the rest of the uncertain fragments are failed in this filter. They must go through all the render operation in the render pipeline. Fragment on the uncovered pixels or on the un-occluded pixels can go through the later Z test (depth test) process without ZR (depth buffer read). Fragment on the occluded pixels will be rejected and will not go through the render pipeline.

Besides the finer classification, an adaptive tile size is applied to achieve further classification in the present invention. It means that other categories may be further filtered out from the drawn uncertain pixels when the tile is segmented into sub-tiles. When the tile is segmented into plurality of sub-tiles, the depth range (Zmax and Zmin) in each sub-tile is finer and closer to the local depth variation. Some occluded, un-occluded, and uncovered pixels can be therefore filtered out. It is not too hard to do the sub-tile decision in the present invention through the coverage mask situation. The adaptive tile size is really helpful for fine filter and its decision won't cost too much memory bandwidth or power consumption. Moreover, because the coverage mask only records whether the pixel is drawn or not, to clear the coverage mask instead of the whole Z buffer is easier for washing out the whole depth memory. Obviously, it also saves the memory bandwidth while the scene is changed.

BRIEF DESCRIPTION OF THE DRAWINGS

FIG. 7—A sketch to show the memory storage of coverage mask for different sub-tile situations in the present invention.

DETAILED DESCRIPTION OF THE PREFERRED EMBODIMENTS

Figure 1:
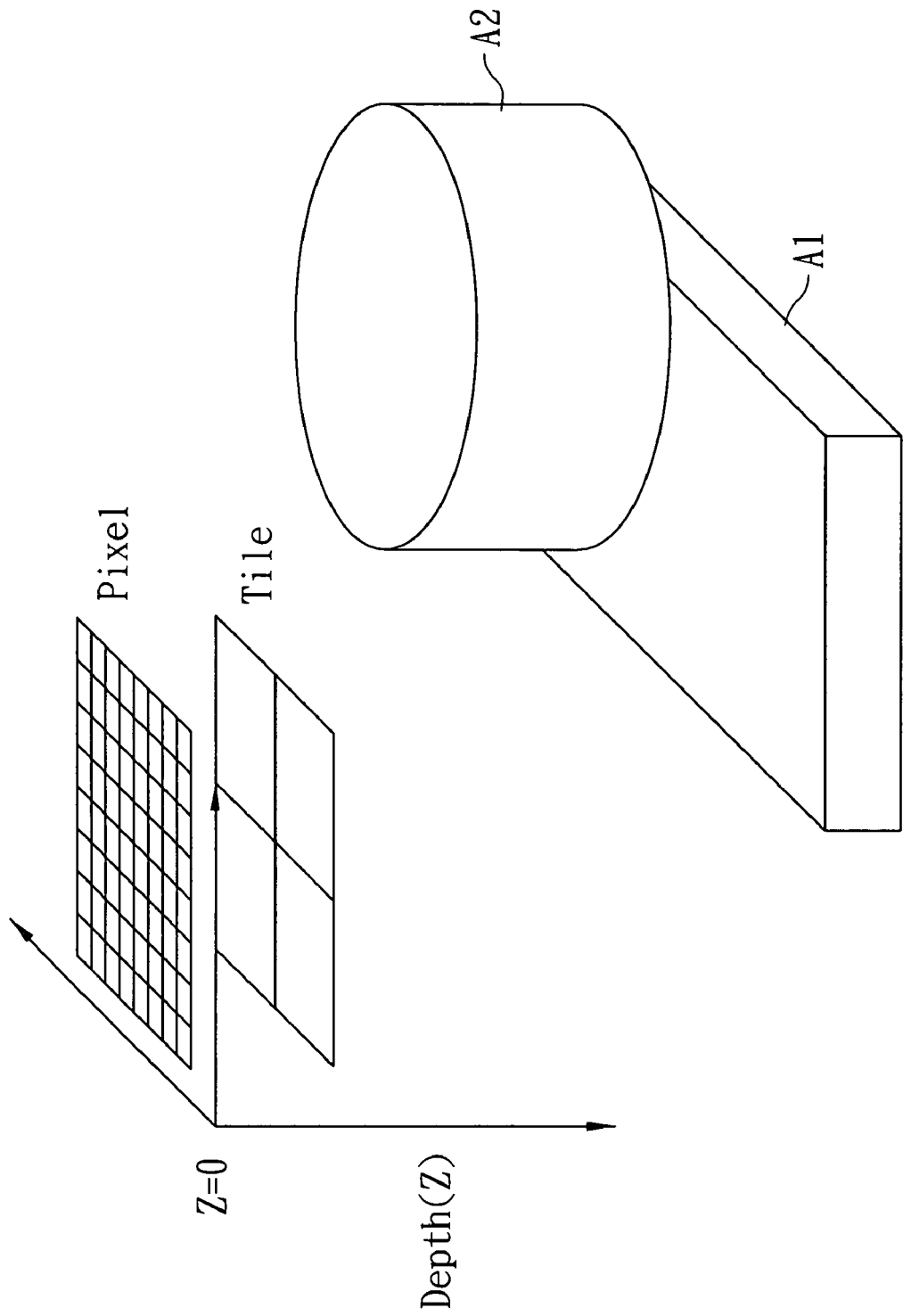
FIG. 1—A geometry sketch of three dimensional graphics of the present invention, wherein Scene depth is marked as Z and pixels are distributed on the other two dimensions.
Figure 2:
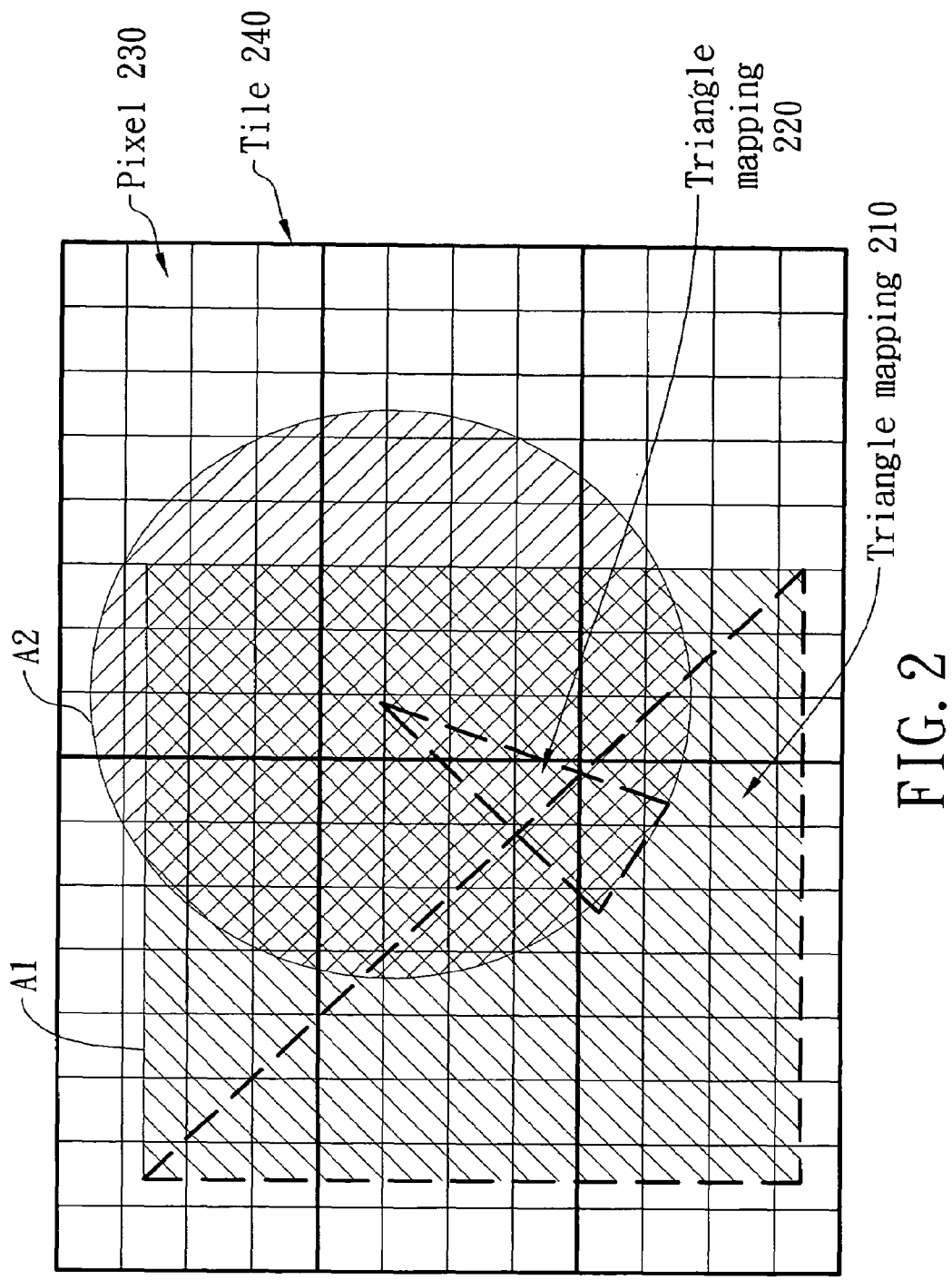
FIG. 2—A sketch to show the relation between pixels and tiles in the present invention.
Figure 3:
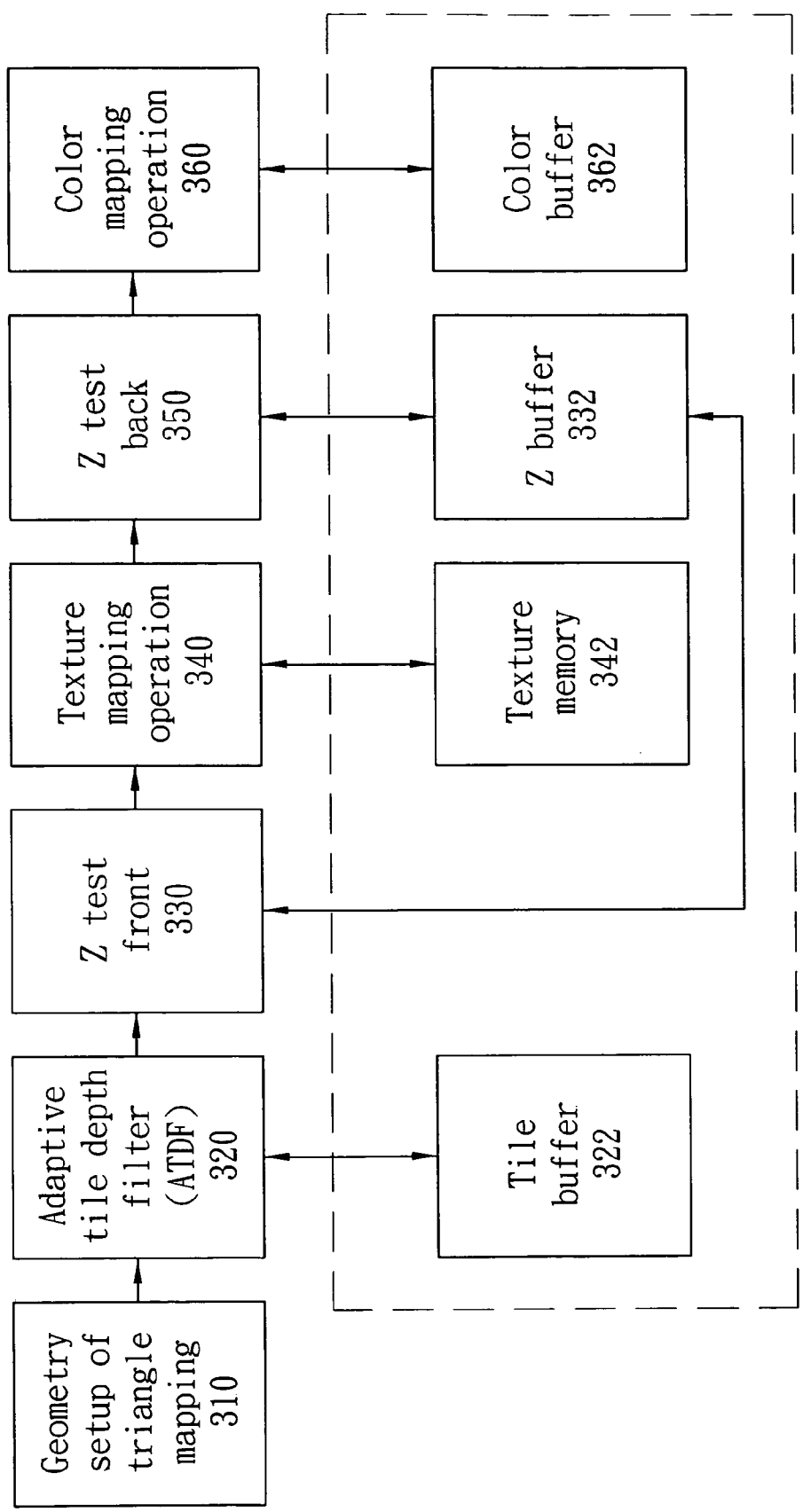
FIG. 3—A chart for three dimensional graphics process in the present invention.

As shown on FIG. 1, in order to display three dimensional objects on a two dimensional screen, it is very important to maintain the depth relationship between those objects. A conventional depth test (Z test) in render pipeline is to read the depth information from depth buffer (Z buffer), build the depth relationship, and store (write) in Z buffer pixel by pixel. As shown on FIG. 2, the Z test has to discriminate the non-occluded and occluded fragments of every triangle mapping 210, 220 by their depth information. The memory bandwidth and the discrimination operation amount are huge and dramatically increasing depending on the depth complexity of each pixels and the total frame pixels. In the present invention, a depth filter can cull the occluded fragments at first before the Z test 330 for saving memory bandwidth and discrimination operation. Besides, the depth filter can filter out no-Z-read fragments which can go through Z test 330 without Z buffer 332 reading for saving memory bandwidth of ZR. The chart of three dimensional graphics in the present invention is shown on FIG. 3. The geometry information will be passed to the adaptive tile depth filter 320 after geometry setup 310. The results of adaptive tile depth filter then go through the Z test front 330 for building depth relationship. All viewable points resulting from Z test will be passed to texture mapping operation 340 and then to color mapping operation 360. There is a Z test back 350 needed after texture mapping operation 340, if their texture mapping has opened Alpha test, transparent texture, or other special visibility effect texture.

In the first embodiment, if the whole display region consists of 64×64 pixels 230, there are 8×16=128 tiles 240 (i.e. area inside bold solid line in FIG. 2) segmented from display region with 8×4 pixels per tile. In the beginning of geometry setup 310, all triangle mappings are set up in tile base. It means there is one tile-base loop included by the triangle mapping loop. Before the start of tile-base loop, current depth range (CurZmax and CurZmin) is gathered to statistics and a coverage mask 510 is built as "1" state for each tile. The current depth range (CurZmax and CurZmin) will be stored in Tile buffer 322 with 128(tile amount)×2×16(CurZmax and CurZmin) bits. The coverage mask 510 which represents the state of drawn or un-drawn with flag "1" or "0" individually will be stored in tile buffer 322 with 128(tile amount)×32 (pixel amount in a tile)×1 bits (i.e. 64×64 bits). At the beginning of tile-base loop, previous tile depth range (DstZmax 410 and DstZmin 412) and coverage mask 510 will be fetched from tile buffer 322 for filter criteria.

Figure 4:
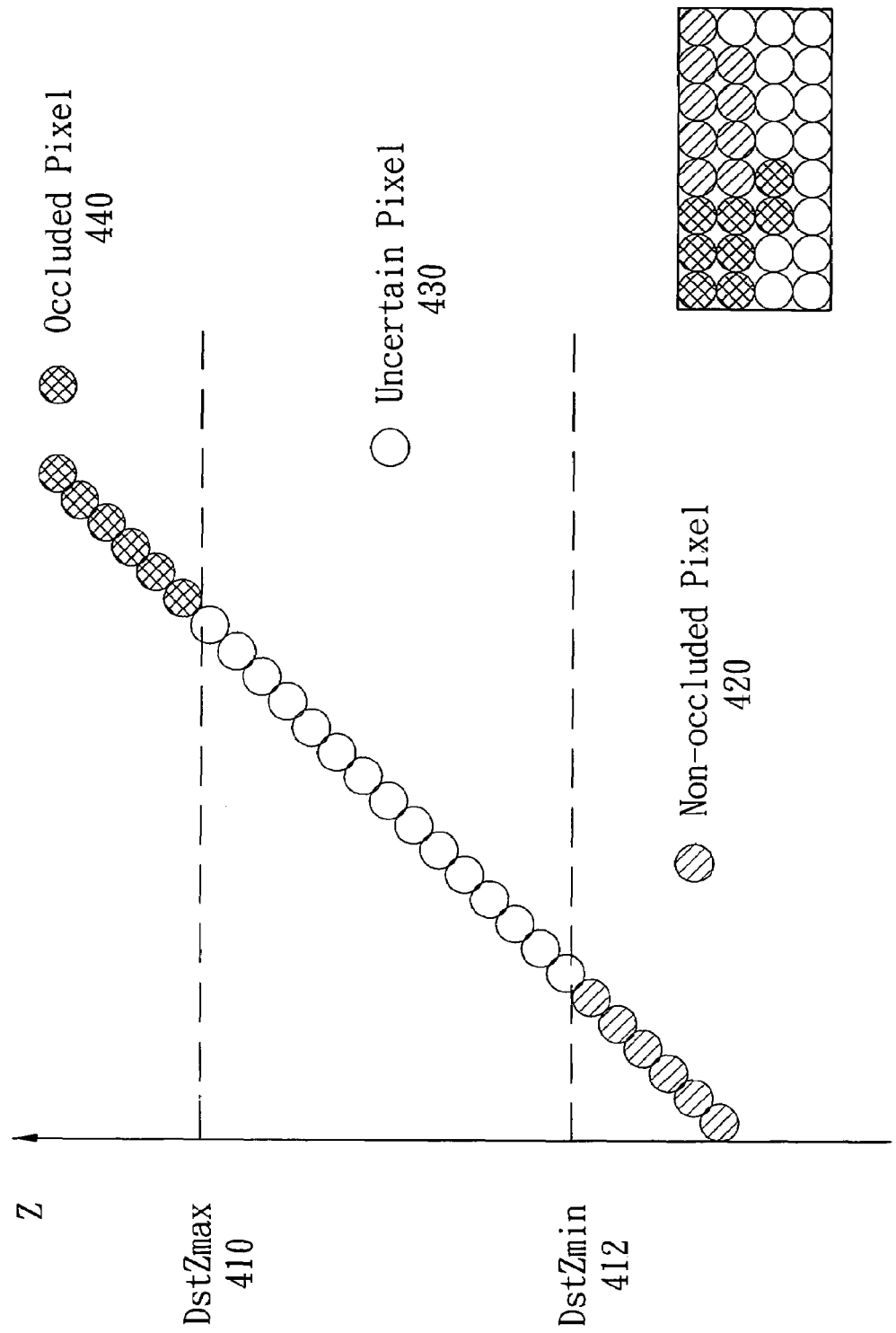
FIG. 4—A diagram to show three parties of pixels divided by depth range, Zmax and Zmin in the present invention.
Figure 5:
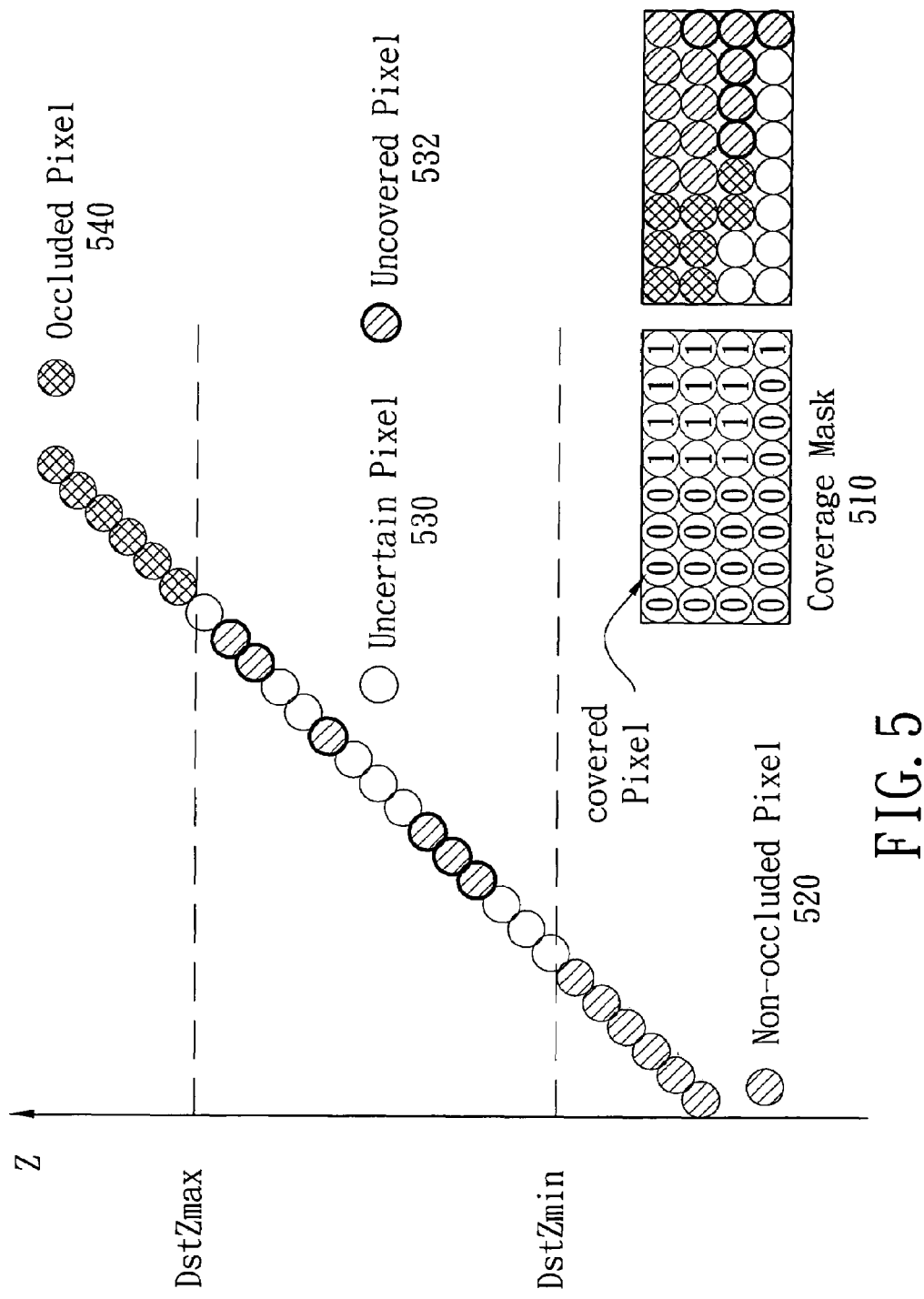
FIG. 5—A diagram to show four parties of pixels divided by depth range, Zmax and Zmin, and coverage mask in the present invention.
Figure 6:
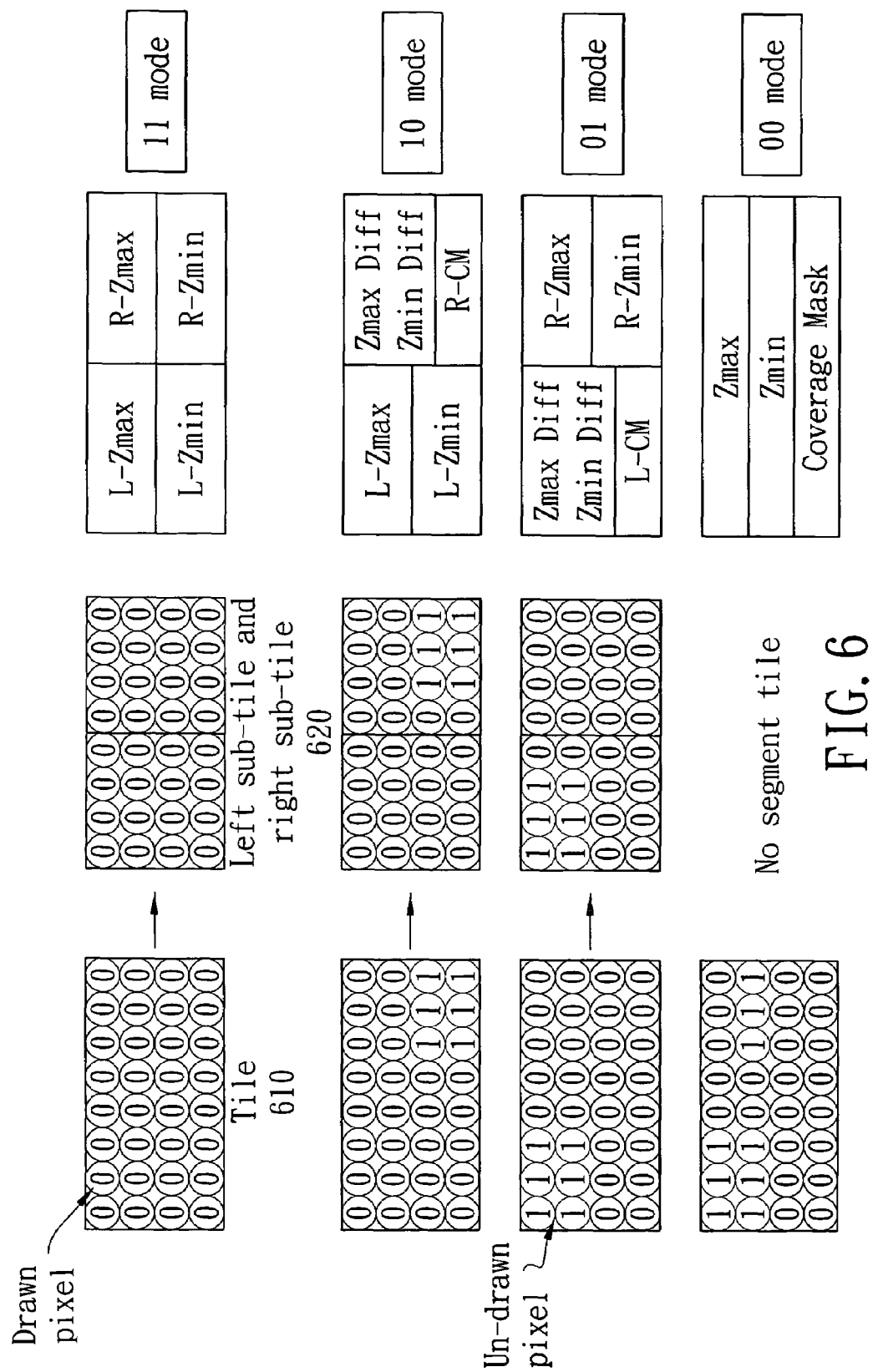
FIG. 6—A sketch of how to decide sub-tile situations by coverage mask in the present invention.
Figure 8:
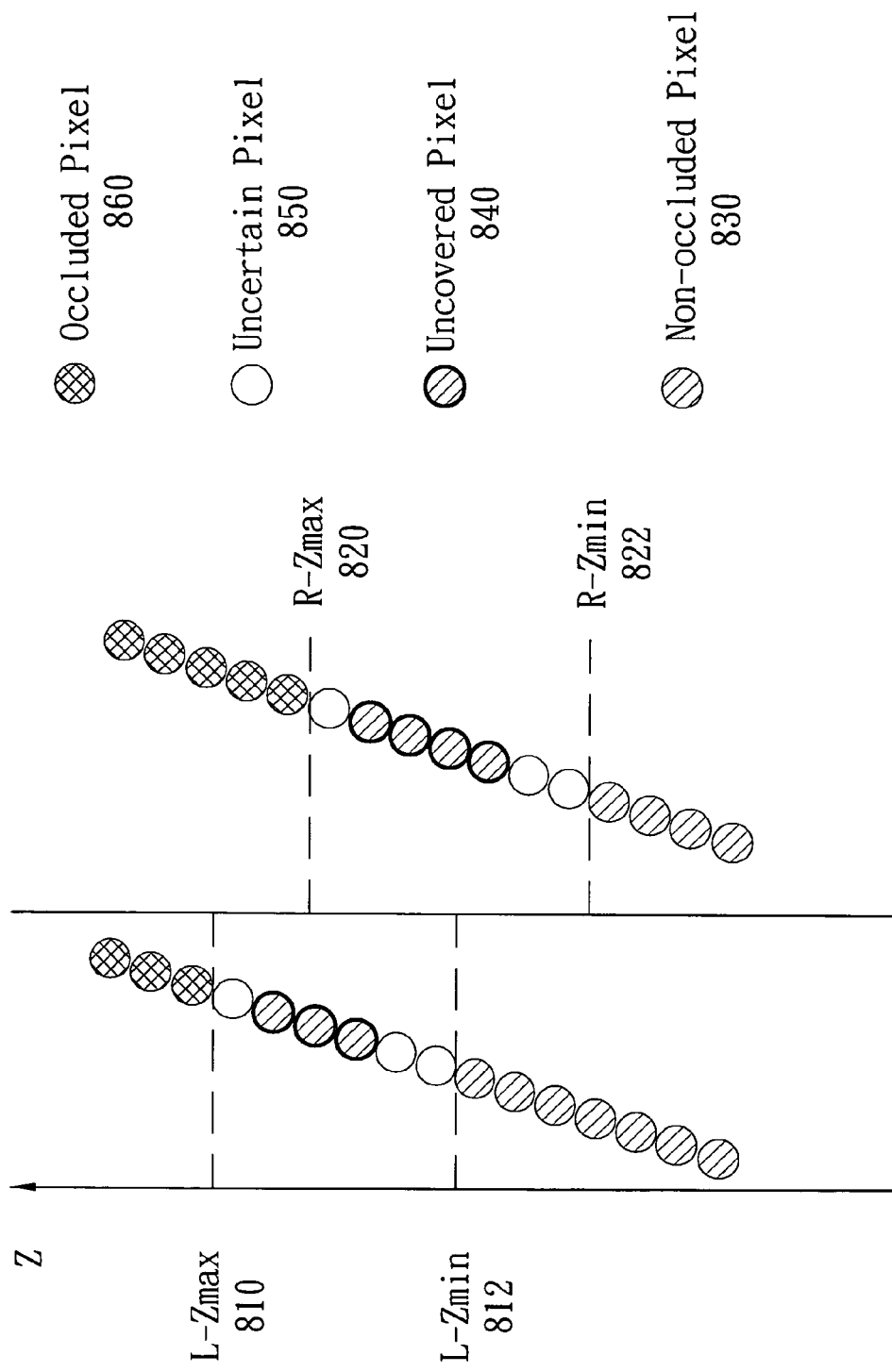
FIG. 8—A diagram to show four parties of pixel divided by depth range in each sub-tile individually in the present invention.

Inside the tile-base loop, a pixel-base loop will be used for pixel classification. For FIG. 4, circles represent the fragment's pixels in a tile. If a pixel's depth is smaller than previous minimum depth (DstZmin 412), it is a non-occluded pixel 420. If a pixel's depth is larger than previous maximum depth (DstZmax 410), it is an occluded pixel 440. If a pixel's depth is between DstZmin 412 and DstZmax 410, it is an uncertain pixel 430 (see empty circles in FIG. 4). Next, by mapping coverage mask 510 to those uncertain pixels 430, the un-drawn pixels 532 whose flag is "1" can be filter out from those uncertain pixels 430 (see bold empty circles 532 in FIG. 5). The rest of uncertain pixels 530 after the coverage mask mapping are normal points (see empty circles 530 in FIG. 5) which need to go through the Z test without any reduced process. The occluded pixels 540 are un-viewable points (rejected points) culled by graphics process. The un-occluded 520 and uncovered (un-drawn) pixels 532 are viewable points (no-Z-read points) which need to go through the Z test without depth buffer read (ZR). Note that the viewable points also save the memory bandwidth of ZR in Z test. When all pixels are classified, the current tile depth range (CurMax and CurMin) is matched with the previous tile depth range (DstMax 410 and DstMin 412) to get a new tile depth range instead of DstMax and DstMin. The new tile depth range and the output of an AND gate with two inputs of current and previous coverage mask will be stored in tile buffer 322. Another feature of the present invention is the adaptive tile size. When the original tile 610 is segmented into sub-tiles 620, some occluded points 860 or no-Z-read point may be filtered out from the uncertain and drawn pixels for the finer depth range 810, 812, 820, 822 of sub-tiles. In the first embodiment, the 8×4 pixels tile 610 will be segmented into two 4×4 pixels sub-tiles 620 (left and right sub-tiles), if the whole coverage mask is marked as "0" (i.e. all pixels are drawn), or all of the left half coverage mask is marked as "0" or all of the right half coverage mask is marked as "0" at least (see FIG. 6). After segment, there are two depth ranges (L-Zmax 810 and L-Zmin 812, and R-Zmax 820 and RZmin 822) for left and right sub-tile individually. Pixels in the left and right sub-tiles will be classified by the finer or more localized depth range. Besides, the coverage mask of one of the sub tile (L-CM or R-CM) can filter out the un-drawn pixels 840 from uncertain pixels of one of the sub tile (see FIG. 8). For the sake of adaptive tile size, the uncertain pixels in 8×4 pixels tile may be classified further by the depth range of sub-tiles.

Figure 7:
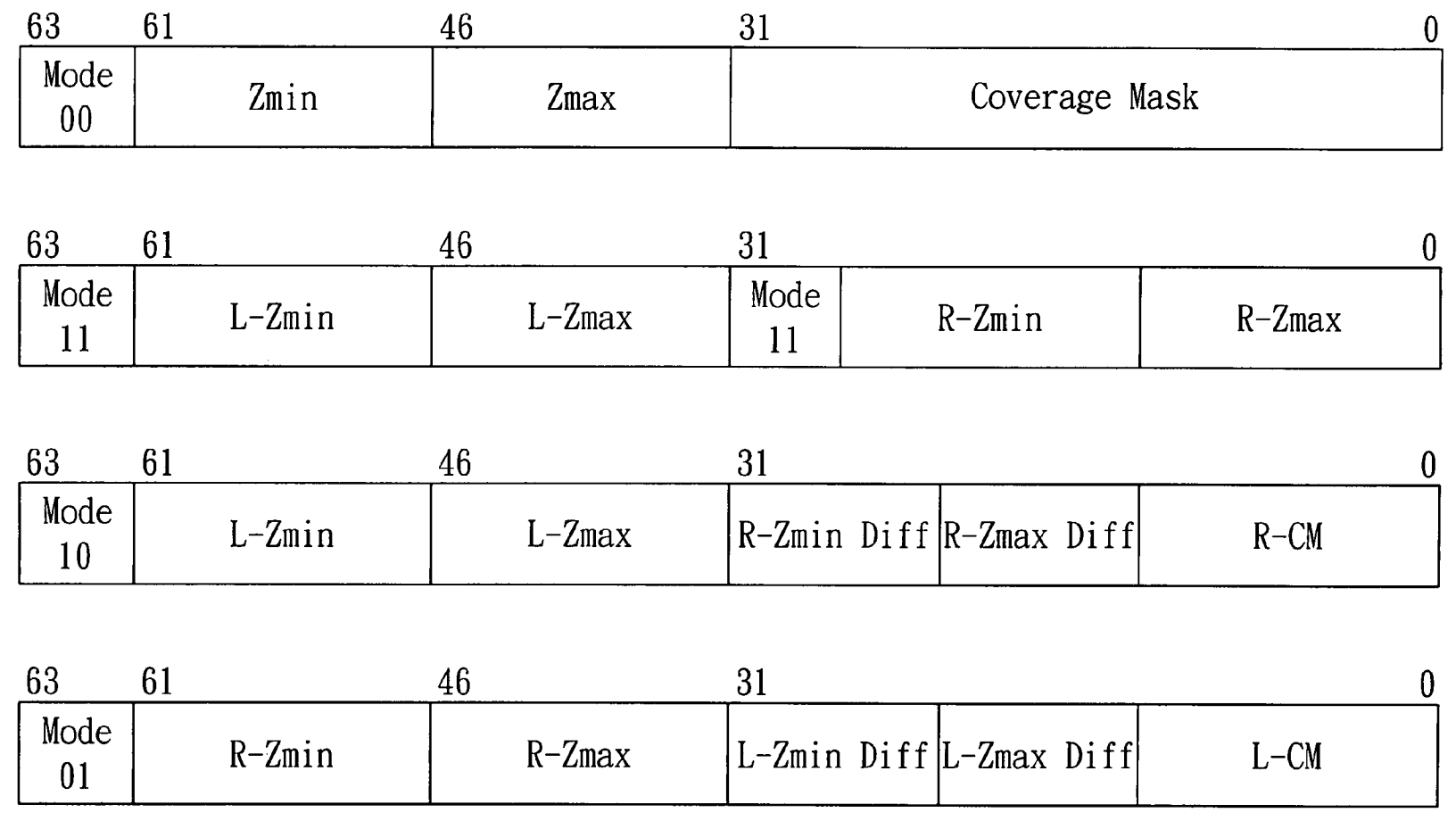

In the first embodiment, even though 8×4 pixels tile is segmented into two sub-tiles, the information of depth ranges and coverage mask for these two sub-tiles can be all stored in the tile buffer 322 with the same memory size as before. As the mode 11 in FIG. 6 (Full Sub Tile) whose whole coverage mask is marked as "0", the mode stage "11" can represent whole coverage mask state because whole coverage mask is "0". Therefore, the original tile buffer size can be used to store the depth ranges of left and right sub-tiles. As the mode 11 in FIG. 7, the depth ranges of left and right sub-tiles occupy 4×15 bits, and the leave 4 bits is used to store two mode stages "11" for both sides. If the state of coverage mask is as well as the mode 10 in FIG. 6 (Sub-tile with Right Coverage Mask) whose coverage mask in left half is all marked as "0", the mode stage "10" can be used instead of storage of left half coverage mask. Therefore, the original tile buffer size can be used to store the depth ranges of left and right sub-tiles and the right-half coverage mask. As the mode 10 in FIG. 7, the depth range of left sub-tile occupies 2×15 bits of the tile buffer. The depth range difference between right sub-tile and left sub-tile will be compressed and occupy 2×8 bits of the tile buffer. The coverage mask of right sub-tile occupies 16 bits of the tile buffer. Then, there are two bits left for the mode stages "10" storage. If the state of coverage mask is as well as the mode 01 in FIG. 6 (Sub-tile with Left Coverage Mask) whose coverage mask in right half is marked as "0", the mode stage "01" can be used instead of storage of right half coverage mask. Therefore, the original tile buffer size can be used to store the depth ranges of left and right sub-tiles and the left-half coverage mask. As the mode 01 in FIG. 7, the depth range of right sub-tile occupies 2×15 bits of the tile buffer. The depth range difference between left sub-tile and right sub-tile will be compressed and occupy 2×8 bits of the tile buffer. The coverage mask of left sub-tile occupies 16 bits of the tile buffer. Then, there are two bits left for the mode stages "01" storage. Note that the whole coverage mask (CM) will occupy 32 bits, the depth range (Zmax and Zmin) will occupy 2×15 bits, and the mode stage "00" will occupy the last 2 bits of the tile buffer (see mode "00" in FIG. 6) for the un-segmented tile (8×4 pixels).

When all points are classified (after ATDF), all normal points and viewable points (no-Z-read points) will be passed to next process, Z test 330. The un-viewable points (rejected points) will be culled (rejected) before the Z test 330. The viewable points will go through the Z test 330 without the Z read operation (see FIG. 3). The normal points will go through the normal Z test 330 process to produce viewable points. After Z test 330, all viewable points are passed to next texture mapping operation 340. There needs a Z test back 350 after texture mapping operation 340, if their texture mapping has opened Alpha test, transparent texture, or other special visibility effect texture. Last, all viewable points are passed to color mapping operation 360 to complete three dimensional graphics pipeline. Note that there are a texture memory 342 and a color buffer 362 in external memory area for texture and color information storages individual.

By the above descriptions and figures, the present invention can provide a system and method for Adaptive Tile Depth Filter (ATDF) which has the advantages of reducing redundant memory bandwidth and better filter performance.

The invention claimed is:

1. A system for adaptive tile depth filter in three dimensional graphics pipeline, comprising:
    a geometry setup device, adapted for processing a geometrical calculation of triangle mappings of the three dimensional graphics, and dividing a display region into a plurality of tiles, the tiles serving as scan units of the triangle mappings;
    an adaptive tile depth filter device, associated with a tile buffer for temporary storages of depth range (Zmax and Zmin) for up-limit and low-limit of tile depth, coverage mask (CM) for pixel's drawn or un-drawn mask, and mode in each said tile;
    wherein said adaptive tile depth filter device comprises:
    a triangle mapping loop device adapted for scanning the triangle mappings, said triangle mapping loop device comprising a tile loop device adapted for scanning each of the tiles, and said tile loop device comprising a tile pixel loop device adapted for scanning the pixels in the tile;
    said tile pixel loop device comprising:
        (a) a depth calculator to get pixel depth value (Z value);
        (b) a pixel classification component to classify four pixel parties according to the pixel depth value, and the depth range (Zmax and Zmin) and coverage mask (CM) from said tile buffer, said four pixel parties being occluded pixel, non-occluded pixel, uncertain pixel, and uncovered pixel; and
        (c) a point classification component to classify three point parties from said four pixel parties, said three point parties being no-z-read point where non-occluded pixel and uncovered pixel are, normal point where uncertain pixel is, and rejected point where occluded pixel is; and
    said tile loop device comprising:
        a tile information update component in response to the request of said tile pixel loop device for said tile buffer updating;
        a coverage mask classification component to classify tile into three sub-tile modes which are full sub-tile mode with whole drawn coverage mask, part sub-tile mode with part drawn coverage mask, and non-sub-tile mode with the other coverage mask;
        a tile segment component to segment said tile into plurality of sub-tiles including one sub-tile at least with whole drawn coverage mask inside the sub-tile for said full sub-tile mode and said part sub-tile mode;
    a sub-tile loop device comprising a sub-tile pixel loop device, said sub-tile pixel loop device comprising
        (a) a sub-tile depth calculator to get sub-tile pixel depth value (Z value),
        (b) a sub-tile pixel classification component to classify four sub-tile pixel parties according to the sub-tile pixel depth value, the sub-tile depth range (sub-Zmax and sub-Zmin), and sub-tile coverage mask (sub-CM), wherein said four sub-tile pixel parties are occluded pixel, non-occluded pixel, uncertain pixel, and uncovered pixel,
        (c) a sub-tile point classification component to classify three sub-tile point parties from said four sub-tile pixel parties, wherein said three sub-tile point parties are no-z-read point where non-occluded pixel and uncovered pixel are, normal point where uncertain pixel is, and rejected point where occluded pixel is; and
    a sub-tile information update component in response to the request of said sub-tile pixel loop device for tile buffer updating.

2. The system according to claim 1, wherein said tiles have the adaptive tile size and number and comprise the display region.

3. The system according to claim 1, wherein said tile buffer follows the storage formats:
    (a) for the non-sub-tile mode (mode "00"), whole coverage mask of each said tile occupying the memory space equal to the number of entire tile pixels multiplied by one bit, the depth range of each said tile occupying the memory space equal to the number of initial depth precision multiplied by 2 bits, and the mode of each said tile occupying 2 bits instead of 2 bits of memory space of said depth range;
    (b) for the full sub-tile mode (mode "11"), whole coverage mask of each said sub-tile occupying zero memory space, the depth range of each said sub-tile occupying the memory space equal to the number of initial depth precision multiplied by 2 bits, and the mode of each said sub-tile occupying 2 bits instead of 2 bits of memory space of said depth range of sub-tile;
    (c) for the part sub-tile mode (mode "01" or mode "10"), the coverage mask of one of said sub-tiles with whole drawn coverage mask inside (NCM sub-tile) occupying zero memory space, the coverage mask of the other said sub-tile occupying the memory space equal to the number of sub-tile pixels multiplied by one bit, the depth range of the one of said sub-tiles with whole drawn coverage mask inside (NCM sub-tile)occupying the memory space equal to the number of initial depth precision multiplied by 2 bits, the difference between depth range of the other said sub-tiles minus the depth range of the one of said sub-tiles with whole drawn coverage mask inside (NCM sub-tile) occupying the memory space equal to the number of half initial depth precision multiplied by 2 bits through digital compression; and (v)the mode of the tile occupying 2 bits instead of 2 bits of memory space of the depth range of the one of said sub-tiles with whole drawn coverage mask inside (NCM sub-tile).

4. The system according to claim 3, wherein if the tile size is 8×4 pixels, its coverage mask size is 32 bits.

5. The system according to claim 3, wherein if the initial depth precision is set as 16 bits, it costs 32 bits to store maximum depth value (Zmax) and minimum depth value (Zmin) for each tile in side tile buffer.

6. The system according to claim 1, wherein said system comprises:
   at least one Z test front device associated with a Z buffer for temporary storage of depth information of viewable points to filter out viewable points from said normal points and said no-z-read points; and
   a Z test back device to filter out viewable points from said normal points and said no-z-read points if those points has opened Alpha test, transparent texture, or other special visibility effect textures in texture mapping operation.

7. The system according to claim 6, wherein said system further comprises a texture mapping operation device associated with a texture memory for texture information storage to operate texture mapping of the viewable points passed by said Z test.

8. The system according to claim 7, wherein said system further comprises a color operation device associated with a color buffer for display storage of color information to operate color mapping of the viewable points passed by said texture mapping operation device or said Z test back device for Aiphas test, transparent texture, or special visibility effect texture.

9. The system according to claim 1, wherein said system comprises a clear component to reset whole coverage mask state to un-drawn state instead of clearing whole information in Z buffer for scene change.

10. The system according to claim 1, wherein said system is applied on mobile or portable apparatuses including digital camera, digital video camera, personal digital assistant, mobile electronics, third generation cellular phone, portable cellular phone, and smart phone.

11. A method for adaptive tile depth filter in three dimensional graphics pipeline comprising the steps of:
   processing a geometry setup of triangle mapping in a tile-base which is a coarse-grained unit instead of the pixel-base in display region; and
   processing an adaptive tile depth filter, said adaptive tile depth filter device comprising:
   a triangle mapping loop device adapted for scanning the triangle mapping, said triangle mapping loop device comprising a tile loop device adapted for scanning each of the tiles, and said tile loop device comprising:
   a tile pixel loop device adapted for scanning the pixels in the tile, said tile pixel loop device comprising:
      a depth calculator;
      a pixel classification component; and
      a point classification component;
   a tile information update component;
   a coverage mask classification component;
   a tile segment component;
   a sub-tile loop device comprising a sub-tile pixel loop device, said sub-tile pixel loop device comprising:
      a sub-tile depth calculator;
      a sub-tile pixel classification component; and
      a sub-tile point classification component; and
   a sub-tile information update component,
   wherein said adaptive tile depth filter makes the following proceedings:
      (a) generating a pair of depth range (Zmax and Zmin) for up-limit and low-limit of tile depth, a coverage mask (CM) for pixel's drawn or un-drawn mask, and a tile mode in each said tile;
      (b) creating a multi-loop to scan every pixel in a traversed tile for every triangle mapping;
      (c) using said depth calculator for calculating depth value on all the pixels in the traversed tile;
      (d) using said pixel classification component and utilizing the depth value, the depth range, and the coverage mask in the traversed tile to classify pixels into four parties, occluded pixel, non-occluded pixel, uncertain pixel, and uncovered pixel;
      (e) using said point classification component for receiving the four parties of pixel and classifying them into three parties of points, no-z-read point where non-occluded pixel and uncovered pixel are, normal point where uncertain pixel is, and rejecting point where occluded pixel is;
      (f) using the a tile information update component for updating the new depth range and the new coverage mask in the traversed tile;
      (g) using the a coverage mask classification component for receiving the coverage mask to classify the traversed tile into three modes of sub-tile, which are full sub-tile mode with whole drawn coverage ask, part sub-tile mode with part drawn coverage mask, and non-sub-tile mode with the other coverage mask;
      (h) using the tile segment component for segmenting the traversed tile into plurality of sub-tiles including one sub-tile at least with whole drawn coverage mask inside the sub-tile for said full sub-tile mode and said part sub-tile mode;
      (i) creating a multi-loop to scan every pixel in a traversed sub-tile for every triangle mapping;
      (j) using said sub-tile depth calculator for calculating depth values on all the pixels in traversed sub-tile;
      (k) using said sub-tile pixel classification component and utilizing the depth value, the depth range, and the coverage mask in the traversed sub-tile to classify pixels into four parties, occluded pixel, non-occluded pixel, uncertain pixel, and uncovered pixel;
      (l) using said sub-tile point classification component for receiving the four parties of pixel and classifying them into three parties of pointes, no-z-read point where non-occluded pixel and uncovered pixel are, normal point where uncertain pixel is, and rejecting point where occluded pixel is; and
      (m) using said sub-tile information update component for updating the new depth range, the new coverage mask, and the sub-tile's mode in the traversed sub-tile.

12. The method according to claim 11, wherein said tiles have the adaptive tile size and number and comprise the display region.

13. The method according to claim 11, wherein if the tile size is 8×4 pixels, its coverage mask size is 32 bits.

14. The method according to claim 11, wherein said method comprises the steps of: at least one Z test front to filter out viewable points from said normal points and said no-z-read points; and Z test back to filter out viewable points from said normal points and said no-z-read points if those points has opened Alpha test, transparent texture, or other special visibility effect texture in texture mapping operation.

15. The method according to claim 14, wherein said method further comprises the step of texture mapping operation to operate texture mapping of the viewable points passed by said Z test.

16. The method according to claim 15, wherein said method further comprises the step of color operation to operate color mapping of the viewable points passed by said texture mapping operation or said Z test back for Alpha test, transparent texture, or special visibility effect texture.

17. The method according to claim 14, wherein said method comprises a clear step to reset whole coverage mask state to un-drawn state instead of clearing whole information in Z buffer for scene change.

18. The method according to claim 14, wherein said method is applied on mobile or portable apparatuses including digital camera, digital video camera, personal digital assistant, mobile electronics, third generation cellular phone, portable cellular phone, and smart phone.

* * * * *